US007552473B2

(12) United States Patent  (10) Patent No.: US 7,552,473 B2
Nachenberg  (45) Date of Patent: Jun. 23, 2009

(54) DETECTING AND BLOCKING DRIVE SHARING WORMS

(75) Inventor: Carey S Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 1044 days.

(21) Appl. No.: 10/640,351

(22) Filed: Aug. 12, 2003

(65) Prior Publication Data

US 2005/0039082 A1  Feb. 17, 2005

(51) Int. Cl.
G06F 11/00 (2006.01)
(52) U.S. Cl. .............................. 726/22; 726/25; 705/51; 705/52; 705/53; 705/54; 713/189; 713/190; 713/191; 717/174; 717/175; 717/176
(58) Field of Classification Search .................. 726/22, 726/25; 713/189–191; 705/51–54; 717/174–176
See application file for complete search history.

(56) References Cited

U.S. PATENT DOCUMENTS

| | | | |
|---|---|---|---|
| 6,088,803 A | | 7/2000 | Tso et al. |
| 6,594,686 B1 | | 7/2003 | Edwards et al. |
| 6,842,861 B1 | * | 1/2005 | Cox et al. .................... 713/188 |
| 6,973,577 B1 | * | 12/2005 | Kouznetsov ................. 726/25 |
| 2002/0129277 A1 | * | 9/2002 | Caccavale .................... 713/201 |
| 2002/0138585 A1 | | 9/2002 | Sen |
| 2002/0147915 A1 | * | 10/2002 | Chefalas et al. ............. 713/188 |
| 2004/0098607 A1 | * | 5/2004 | Alagna et al. ............... 713/200 |

FOREIGN PATENT DOCUMENTS

| | | |
|---|---|---|
| GB | 2383444 A | 6/2003 |
| WO | WO 01/57829 A2 | 8/2001 |
| WO | WO 02/06928 A2 | 1/2002 |

OTHER PUBLICATIONS

Delio, M., "Virus Throttle a Hopeful Defense", Wired News, Dec. 9, 2002 [online] Retrieved from the Internet <URL:http://www.wired.com/news/infostructure/0,1377,56753,000.html>.
Lowe R. et al., WinXP Pro File Sharing, Practically Networked, Dec. 12, 2001, [online] [Retrieved on Jun. 10, 2003] Retrieved from the Internet <URL:http://www.practicallynetworked.com/sharing/xp_filesharing/whole.htm>.

(Continued)

*Primary Examiner*—Kambiz Zand
*Assistant Examiner*—Roderick Tolentino
(74) *Attorney, Agent, or Firm*—Fenwick & West LLP

(57) ABSTRACT

A worm detection module (WDM) (212) stops worms and other malicious software from spreading among computer systems (100) on a network (210) via open drive shares. The WDM (212) monitors (310) a storage device (108) for activity (314, 316) directed to executable files by remote processes. The WDM (212) flags (318) files (216) that are the target of such activity. If a flagged file (216) attempts to create an executable file (218) on a networked computer system (100B), the WDM (212) detects (322) that the flagged file (216) is a worm. In response, the WDM (212) blocks the write to the networked computer system (100B) and thereby prevents the worm from propagating.

21 Claims, 3 Drawing Sheets

OTHER PUBLICATIONS

Microsoft web pages, "Microsoft Palladium: A Business Overview," pp. 1-10 [online], Amy Carroll, Mario Juarez, Julia Polk and Tony Leininger, Aug. 2002 [retrieved on Oct. 10, 2002]. Retrieved from the Internet: <URL:http://www.microsoft.com/PressPass/features/2002/jul02/0724palladiumwp.asp>.

Microsoft web pages, "Microsoft Palladium Initiative—Technical FAQ," pp. 1-8 [online], Aug. 2002 [retrieved on Oct. 10, 2002]. Retrieved from the Internet: <URL:http://www.microsoft.com/technet/security/news/PallFAQ2.asp?frame=true>.

Moore, D. et al., Code-Red: A Case Study On The Spread And Victims Of An Internet Worm, Proceedings of the Internet Measurement Workshop (IMW), 2002, [online] [Retrieved on Dec. 16, 2003] Retrieved from the Internet <URL:http://www.citeseer.nj.nec.com/moore02codered.html>.

New Windows Worms At Work In May web page, Shout Communications, [online] [Retrieved on Dec. 16, 2003] Retrieved from the Internet <URL:http://www.shoutasia.com/trend/clients_trend_may_virus.htm>.

Staniford, S. et al., How To Own The Internet In Your Spare Time, Proceedings of the 11the USENIX Security Symposium, 2002, [online] [Retrieved on Dec. 16, 2003] Retrieved from the Internet <URL://http://citeseer.nj.nec.com/staniford02how.html>.

Toth, T. et al., Connection-History Based Anomaly Detection, Proceedings of the 2002 IEEE, Workshop On Information Assurance And Security, Jun. 2002, pp. 30-35, vol. 17-19, United States Military Academy, West Point, N.Y.

Trusted Computing Platform Alliance, "Building a Foundation of Trust in the PC," pp. 1-9, Jan. 2000.

Trusted Computing Platform Alliance web pages. "TCPA / Palladium Frequently Asked Questions," pp. 1-13 [online], Ross Anderson [retrieved on Oct. 10, 2002]. Retrieved from the Internet: <URL:http://www.cl.cam.ac.uk/~rja14/tcpa-faq.html>.

Williamson, M., "Throttling Viruses: Restricting Propagation to Defeat Malicious Mobile Code", ACSAC Conference, Dec. 2002, pp. 1-9, Hewlett-Packard, Dec. 10, 2002.

Windows XP Simple File Sharing web page, Practically Networked, [online] [Retrieved on Jun. 10, 2003] Retrieved from the Internet <URL:http://www.practicallynetworked.com/sharing/xp/filesharing.htm>.

Chess, David J., Computer Viruses And Related Threats To Computer And Network Integrity, Computer Networks And ISDN Systems, Jul. 10, 1989, pp. 141-148, Amsterdam, NL.

Nachenberg, Carey, Behavior Blocking: The Next Step In Anti-Virus Protection, Mar. 19, 2002, [online] [retrieved on Nov. 29, 2004] Retrieved from the Internet: <URL:http://www.securityfocus.com/printable/infocus/1557>.

European Search Report, European Application No. 04254600, Dec. 21, 2004, 4 pages.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.

* cited by examiner

DETECTING AND BLOCKING DRIVE SHARING WORMS

BACKGROUND OF THE INVENTION

1. Field of the Invention

This invention pertains in general to computer security and in particular to preventing a worm or other malicious and/or unauthorized software from executing on a computer system.

2. Description of the Related Art

A "worm" is a computer program that attempts to infect multiple computer systems. There are a number of ways a worm can initially execute on a computer system. For example, an end-user might unintentionally download the worm from the Internet as a parasitic virus attached to a program. Alternatively, a worm might infect the computer system using transmission media such as email scripts, buffer overflow attacks, password cracking, etc.

Typically, the primary purpose of a worm is to spread to other computer systems. However, a worm can also include functionality to infect files on the computer system, destroy data on the computer system, and/or perform other malicious actions. A successful worm spreads rapidly and can quickly damage many computer systems.

An enterprise such as a corporation usually has multiple computer systems connected by a network. Each computer system has a local storage device, such as a hard drive. Many computer systems use a technique called "drive sharing" to make the contents of the storage devices accessible to the other computer systems on the network. Drive sharing often increases the productivity of the enterprise because it allows the end-users to easily share data contained on their computer systems.

However, one particularly virulent breed of worms uses drive sharing to quickly spread through the computer systems on an enterprise's network. These drive sharing worms can ravage an entire corporate network in hours by copying themselves from hard drive to hard drive over open network drive shares. Drive sharing worms are difficult to eradicate because a disinfected computer system is quickly re-infected via the network.

One technique for preventing worm attacks and virus infections is to install anti-virus software on the computer system in order to detect the presence of worms, viruses, and other malicious software. However, it is sometimes not practical to use anti-virus software on certain computer systems. Moreover, anti-virus software might fail to detect previously unknown worms. In addition, certain types of worms use programming techniques, such as polymorphism or metamorphism, that hamper the effectiveness of anti-virus software.

Accordingly, there is a need in the art for a way to detect and block drive sharing worms and other types of malicious software.

BRIEF SUMMARY OF THE INVENTION

The above need is met by a worm detection module (WDM) (212) that identifies drive sharing worms and other malicious software and blocks the software from spreading to other computer systems (100) on the network (210) via open drive shares. The WDM (212) monitors (310) a storage device (108), such as a hard drive, for activity (314, 316) directed to executable files by remote processes. The WDM (212) flags (318) files (216) that are the target of such activity. If a flagged file (216) attempts to create an executable file (218) on a networked computer system (100B), the WDM (212) detects (322) that the flagged file (216) is a worm. In one embodiment, the WDM (212) performs secondary tests (320) on the flagged file (216) and/or the executable file (218) to determine whether the file has worm-like characteristics. If the secondary tests are satisfied, or if the secondary tests are omitted, the WDM (212) blocks the write to the networked computer system (100B) and thereby prevents the worm from propagating.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
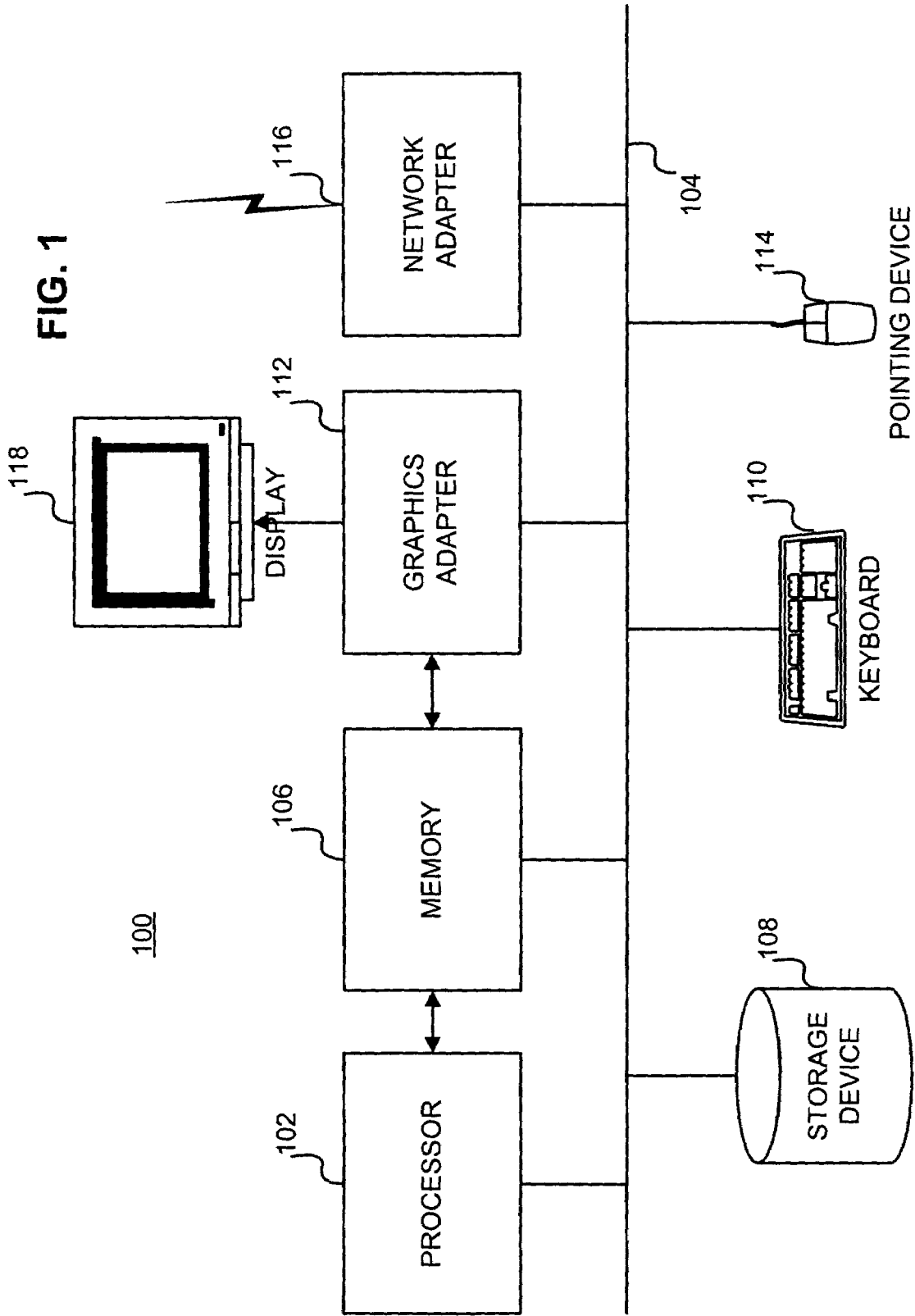
FIG. 1 is a high-level block diagram illustrating a functional view of a typical computer system 100 for use with the present invention.

FIG. 1 is a high-level block diagram illustrating a functional view of a typical computer system 100 for use with the present invention. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. Different types of computer systems may lack one or more of the components described above.

The processor 102 is a general-purpose processor such as an INTEL x86, SUN MICROSYSTEMS SPARC, or POWERPC compatible-CPU. The memory 106 is, for example, firmware, read-only memory (ROM), non-volatile random access memory (NVRAM), and/or RAM, and holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to a network 210.

The storage device 108 is a hard disk drive and/or another device capable of storing data, such as a compact disk (CD), DVD, or a solid-state memory device. As is known in the art, the storage device 108 holds executable programs and data in logical constructs called "files." Depending upon the file system utilized on the storage device, each file can also have one or more stored attributes describing the file. For example, the stored attributes can indicate the name of the file, the date on which the file was last modified, the number of times the file was accessed, the entity that created, accessed or last modified the file, etc. Some file systems support extensible attributes.

As is known in the art, the computer system 100 is adapted to execute computer program modules. As used herein, the term "module" refers to computer program logic for providing the specified functionality. A module can be implemented in hardware, firmware, and/or software. In one embodiment, the modules are stored on the storage device 108. When utilized, the modules are loaded into the memory 106 and executed by the processor 102.

In one embodiment, the storage device 108 holds modules for implementing an operating system on the computer system. Possible operating systems include MICROSOFT WINDOWS, LINUX, and the MAC OS from APPLE COMPUTER. The operating system executes on, and controls the operation of, the computer system 100. In one embodiment, the operating system provides the ability to share data via the computer network 210. In some embodiments, the storage device 108 stores, and the computer system 100 executes, additional and/or different modules for providing networking functionality.

In one embodiment, the files on the storage device 108 are shared with other computer systems on the network as "drive shares." An open drive share makes all or some of the files on the storage device 108 appear to other computer systems on the network 210 as a separate, logical storage device. For example, an end-user of the computer system 100 can use the operating system to share the directory "C:\DOCUMENTS AND SETTINGS\SMITH" on the storage device 108 with the other computer systems on the network 210. End-users of other computer systems on the network 210 can make the directory appear as a logical device on their respective computer systems. Depending upon how the drive share is configured, the networked computer system can have full read/write privileges on the shared drive.

Figure 2:
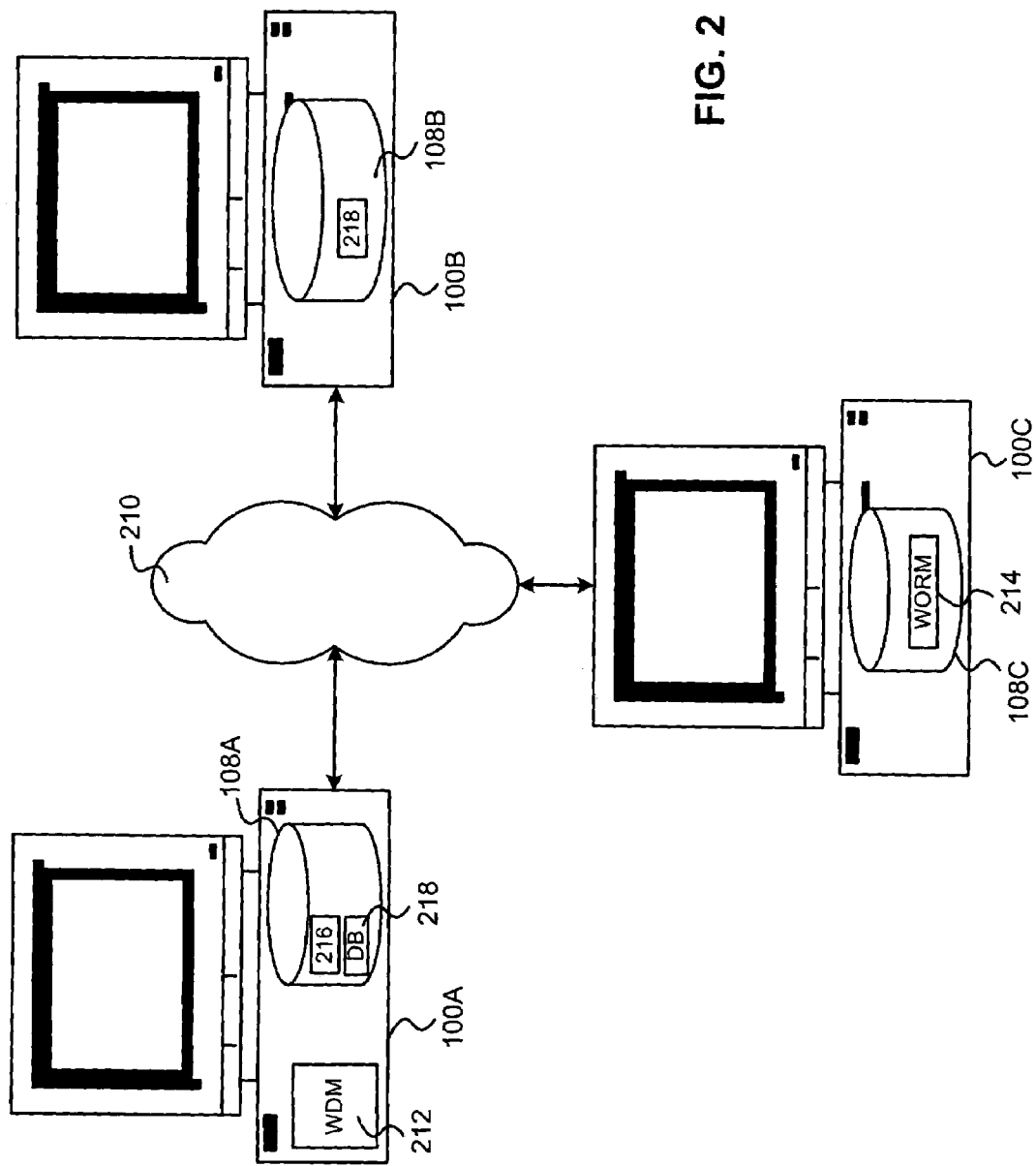
FIG. 2 is a high-level block diagram illustrating a typical enterprise computing environment 200.

FIG. 2 is a high-level block diagram illustrating a typical enterprise computing environment 200. The illustrated environment has multiple computer systems 100 in communication via a conventional computer network 210. Although only three computer systems 100 are shown in FIG. 2, enterprise environments can have hundreds, or thousands, of computer systems coupled to the network 210. The network 210 can include a local area network and/or a wide area network such as the Internet.

FIG. 2 and the other figures use like reference numerals to identify like elements. A letter after a reference numeral, such as "100A," indicates that the text refers specifically to the element having that particular reference numeral. A reference numeral in the text without a following letter, such as "100," refers to any or all of the elements in the figures bearing that reference numeral (e.g. "100" in the text refers to reference numerals "100A," "100B," and/or "100C" in the figures).

Each computer system 100 in FIG. 2 has a storage device 108. Assume for purposes of this description that the storage device 108A of computer system 100A is shared with computer system 100C. Likewise, assume that the storage device 108B of computer system 100B is shared with computer system 100A. There can also be other open drive shares on the network 210.

In the environment 200 of FIG. 2, computer system 100A is executing a worm detection module (WDM) 212 for preventing worms and other malicious software from spreading on the network via the open drive shares. In one embodiment, the WDM 212 implements a stand-alone program. In another embodiment, the WDM 212 is part of a program for providing additional functionality. For example, the WDM 212 can be embodied in program modules that operate to provide comprehensive protection from computer viruses and other malicious software. In addition, the WDM 212 can be integrated into the operating system of the computer system 100A.

In one embodiment, the computer system 100A is configured to execute the WDM 212 at all times while the computer is running. The module can be, for example, executed as a file system driver, as a WINDOWS service, as a software daemon, as an application program, etc. In another embodiment, the WDM 212 is implemented at the network stack level where it can monitor inter-computer communications.

In addition, computer system 100C is executing a worm 214 or other malicious software that is attempting to infect other computer systems on the network 110 via open drive shares. There are multiple ways that the worm 214 might have started executing on computer system 100C. For example, the worm 214 could be a Trojan horse program that executed surreptitiously when the end-user launched another program. Or, the worm 214 might have compromised the computer system 100C through a buffer overflow attack or another attack that allowed the worm to execute itself on the computer system 100C.

The worm 214 on computer system 100C uses the open drive share to create an instance of itself 216 on the storage device 108A of computer system 100A. The new version of the worm 216, in turn, attempts to create a third instance of the worm 218 on the storage device 108B of computer system 100B. However, the WDM 212 executing on computer system 100A detects the presence of the worm 216 and stops it from spreading.

Figure 3:
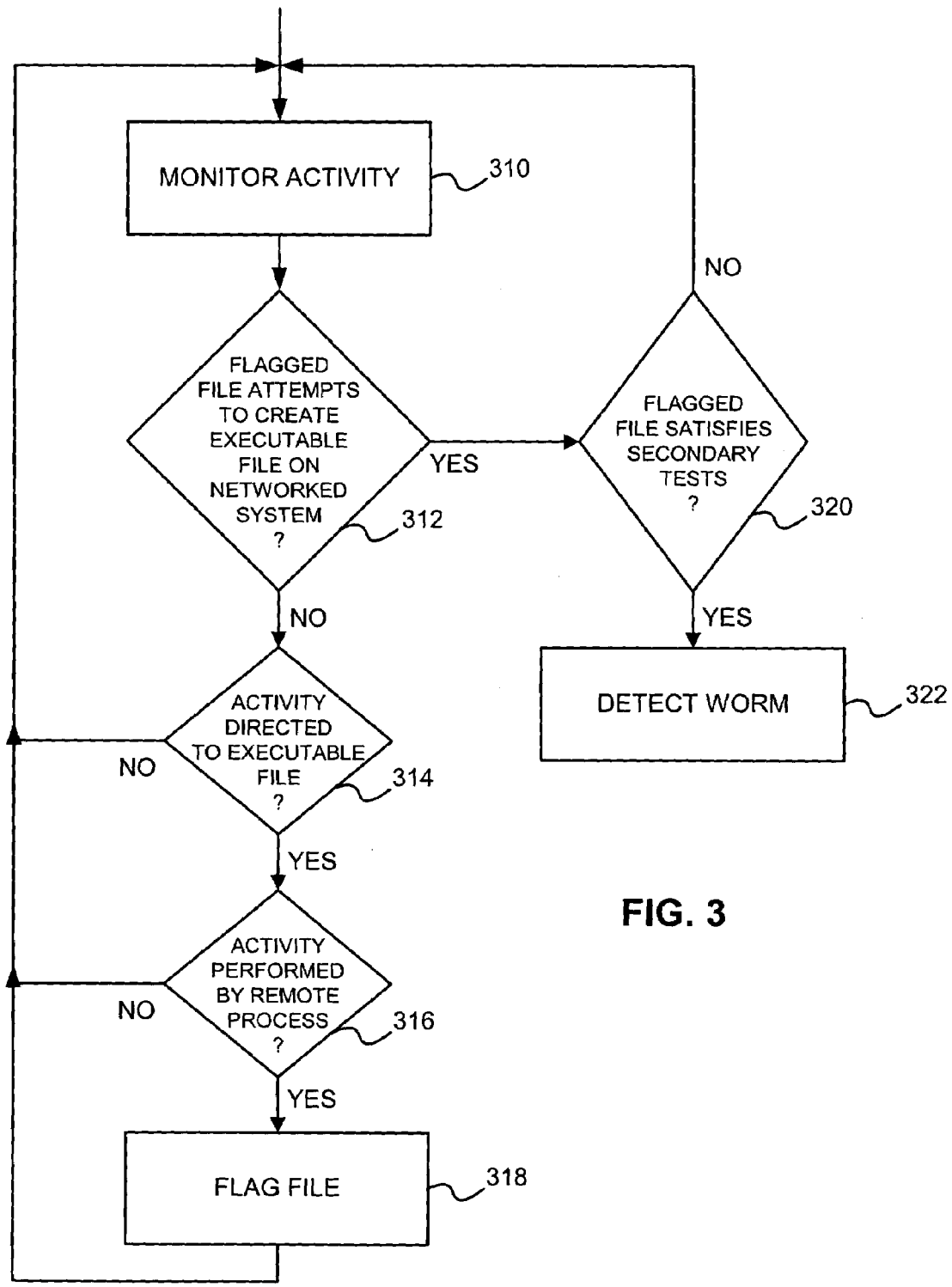
FIG. 3 is a flowchart illustrating steps performed by a worm detection module 212 to stop a worm from spreading through the enterprise computing environment 200 according to one embodiment of the present invention.

FIG. 3 is a flowchart illustrating steps performed by the WDM 212 to stop the worm from spreading according to one embodiment of the present invention. It should be understood that these steps are illustrative only, and that other embodiments of the present invention may perform different and/or additional steps than those described herein in order to perform different and/or additional tasks. Furthermore, the steps can be performed in different orders than the one described herein.

The WDM 212 monitors 310 activity on the local storage device 108A. Specifically, the WDM 212 detects 314 the creation of new executable files 216, or changes to existing files 216 stored in the device 108. In one embodiment, detected changes include modifying an existing executable file, renaming a file to make it executable or non-executable, and any other instances where the storage device 108A is opened for writing.

When the WDM 212 detects 314 activity directed to an executable file 216, it determines 316 whether the activity is being performed by a remote process. A "remote process" is a process executing on another computer system 100 on the network 210. For example, a worm 214 utilizing an open drive share to create a file on the storage device 108A will satisfy this determination.

In one embodiment, the WDM 212 determines 316 whether a process is remote by examining the process identification (process ID) for the process. The process ID is a value assigned by the operating system that identifies the process. Accesses to the storage device 108A initiated by remote processes (i.e., processes not initiated on computer system 100A) are typically performed by a dedicated operating system process. If a remote process initiated the activity, the ID of the process performing the activity will be that of the dedicated operating system process. In contrast, accesses to the storage device 108A initiated by local processes are performed under the process IDs of the local application processes. Accordingly, in one embodiment the WDM 212 compares the process ID of the process performing the activity with the process ID of the operating system. If 316 the process IDs are identical, the activity is being performed by a remote process. Other embodiments of the WDM 212 use other techniques to determine whether an activity is performed by a remote process.

If 316 the activity is performed by a local process, the WDM 212 allows it to proceed normally. If 316 the activity is performed by a remote process, the WDM 212 also allows the activity to proceed normally (since the behavior might be valid). However, the WDM 212 flags 318 the file 216 to indicate that it was created or changed by a remote process. In one embodiment, the file system on the storage device supports extensible attributes. In this case, the WDM 212 flags 318 the file by setting an attribute associated with the file to indicate that the file is flagged. In another embodiment, the WDM 212 maintains a database 218 on the storage device 108A or elsewhere that identifies files that are flagged by the WDM 212. Other embodiments track flagged files in a different manner.

If the WDM 212 observes 312 a flagged file 216 attempting to use drive sharing to create or change an executable file 218 on a networked computer system 100B, the WDM 212 detects 320 that the flagged file 216 is a worm. An attempt to create a new executable file is a clear indication of transitive propagation and is thus a strong indication that the flagged file 216 is malicious. Accordingly, the WDM 212 detects malicious software with a low rate of false positives.

In one embodiment, the WDM 212 performs 320 one or more secondary tests before indicating that the flagged file 216 is a worm. The secondary tests further decrease the likelihood of a false positive detection of malicious software. One secondary test determines whether the new executable file 218 is an exact copy of the flagged file 216. If the new file 218 is an exact copy, then the flagged file 216 is likely a worm. Another test examines the size of the new file 218 to see if it is identical, or similar to, the size of the flagged file. This test is useful in detecting polymorphic or metamorphic worms in which the body of the worm changes from instance to instance yet the size of the file remains substantially constant. Another secondary test heuristically searches the new executable file 218 to determine whether it contains computer program instructions for using drive sharing to replicate itself. If the new file 218 contains these instructions, it is probably a worm. Other embodiments of the WDM 212 perform other secondary tests instead of, or in addition to, the ones described herein.

Once the flagged file is detected as a worm 322, the WDM 212 performs one or more actions to stop the spread of the worm 216. These actions include blocking the flagged file's attempt to write to the open drive on the networked computer system 100B, quarantining the flagged file 216 to prevent it from performing further actions, terminating any processes started by the flagged file, displaying an alert to the end-user, etc. In one embodiment, the actions performed are user-configurable. Thus, different embodiments of the WDM 212 can perform different actions upon detecting 322 that a file is a worm.

The steps described above stop a worm from spreading among the computer systems 100 coupled to the network 210. In the example of FIG. 2, when the worm 214 on computer system 100C creates a new instance of itself 216 on the storage device 108A of computer system 100A, the WDM 212 flags the new instance as a potential worm. When the flagged file 216 attempts to create a third instance of the worm 218 on computer system 100B, the WDM 212 recognizes that the flagged file is engaged in worm-like activity and prevents it from achieving its goal. In this manner, WDM 212 stops the spread of the worm.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A method for halting propagation of malicious software among computer systems connected to a network, comprising:
   identifying an executable program on a storage device of a first computer system, the executable program created or changed responsive to activity initiated on another computer system connected to the network;
   monitoring execution of the identified executable program on the first computer system to detect whether the identified executable program attempts to create or change an executable program on another computer system on the network; and
   responsive to a positive detection, determining that the identified executable program is malicious.

2. The method of claim 1, wherein the identifying comprises:
   detecting activity directed to the executable program on the storage device;
   determining whether the activity is initiated by a process executing on another computer system; and
   flagging the executable program responsive to a positive determination that the activity is initiated by a process executing on another computer system.

3. The method of claim 2, wherein determining whether the activity is initiated by a process executing on another computer system comprises:
   determining a process identification associated with the first computer system;
   determining a process identification of a process that initiated the activity directed to the executable program; and
   determining whether the process identification of the process that initiated the activity matches the process identification associated with the first computer system.

4. The method of claim 2, wherein the storage device of the first computer system has a file system for holding attributes of files on the storage device and wherein flagging the executable program comprises:
   setting a file system attribute of a file associated with the executable program to indicate that the executable program is flagged.

5. The method of claim 2, wherein flagging the executable program comprises:
   updating a record in a database on the storage device of the first computer system to indicate that the executable program is flagged.

6. The method of claim 1, further comprising:
   responsive to a positive detection that the identified program attempts to create or change an executable program on another computer system, testing the created or changed executable program to determine if it has characteristics of malicious software.

7. The method of claim 1, wherein detecting that the identified executable program is malicious comprises:
   blocking the identified program from creating or changing the executable program on another computer system.

8. A computer program product comprising:
   a computer-readable medium having computer program code modules embodied therein for halting propagation of malicious software among computer systems connected to a network, the actions performed by the computer program code module comprising:
   identifying an executable program on a storage device of a first computer system, the executable program created or changed responsive to activity initiated on another computer system connected to the network;

monitoring execution of the identified computer program on the first computer system to detect whether the identified executable program attempts to create or change an executable program on another computer system on the network; and responsive to a positive detection, determining that the identified executable program is malicious.

9. The computer program product of claim 8, wherein the identifying comprises:

detecting activity directed to the executable program on the storage device;

determining whether the activity is initiated by a process executing on another computer system; and flagging the executable program responsive to a positive determination that the activity is initiated by a process executing on another computer system.

10. The computer program product of claim 9, wherein determining whether the activity is initiated by a process executing on another computer system comprises:

determining a process identification associated with the first computer system;

determining a process identification of a process that initiated the activity directed to the executable program; and determining whether the process identification of the process that initiated the activity matches the process identification associated with the first computer system.

11. The computer program product of claim 9, wherein the storage device of the first computer system has a file system for holding attributes of files on the storage device and wherein flagging the executable program comprises:

setting a file system attribute of a file associated with the executable program to indicate that the executable program is flagged.

12. The computer program product of claim 9, wherein flagging the executable program comprises:

updating a record in a database on the storage device of the first computer system to indicate that the executable program is flagged.

13. The computer program product of claim 8, further comprising:

responsive to a positive detection that the identified program attempts to change an executable program on another computer system, testing the changed executable program to determine if it has characteristics of malicious software.

14. The computer program product of claim 8, wherein detecting that the identified executable program is malicious comprises:

blocking the identified program from creating or changing the executable program on another computer system.

15. A system for halting propagation of malicious software among computer systems connected to a network, comprising:

a worm detection module adapted to execute on a first computer system connected to the network, the worm detection module adapted to perform actions comprising:

identifying an executable program on a storage device of a first computer system, the executable program created or changed responsive to activity initiated on another computer system connected to the network;

monitoring execution of the identified computer program on the first computer system to detect whether the identified executable program attempts to create or change an executable program on another computer system on the network; and responsive to a positive detection, determining that the identified executable program is malicious.

16. The system of claim 15, wherein the actions performed by the worm detection module further comprise:

detecting activity directed to the executable program on the storage device;

determining whether the activity is initiated by a process executing on another computer system; and flagging the executable program responsive to a positive determination that the activity is initiated by a process executing on another computer system.

17. The system of claim 16, wherein determining whether the activity is initiated by a process executing on another computer system comprises:

determining a process identification associated with the first computer system;

determining a process identification of a process that initiated the activity directed to the executable program; and determining whether the process identification of the process that initiated the activity matches the process identification associated with the first computer system.

18. The system of claim 16, wherein the storage device of the first computer system has a file system for holding attributes of files on the storage device and wherein flagging the executable program comprises:

setting a file system attribute of a file associated with the executable program to indicate that the executable program is flagged.

19. The system of claim 16, wherein flagging the executable program comprises:

updating a record in a database on the storage device of the first computer system to indicate that the executable program is flagged.

20. The system of claim 15, wherein the actions performed by the worm detection module further comprise:

responsive to a positive detection that the identified program attempts to create or change an executable program on another computer system, testing the changed executable program to determine if it has characteristics of malicious software.

21. The system of claim 15, wherein detecting that the identified executable program is malicious comprises:

blocking the identified program from changing the executable program on another computer system.

* * * * *